US005807110A

United States Patent [19]

Hytry et al.

[11] Patent Number: 5,807,110

[45] Date of Patent: Sep. 15, 1998

[54] METHOD AND DEVICE FOR SELECTING COLOR COORDINATED DESIGNS

[75] Inventors: Reneé Mary Hytry, Cincinnati, Ohio; Robert Thomas Ellis, Apopka, Fla.; William Brent Roush, Cincinnati, Ohio

[73] Assignee: Formica Corporation, Cincinnati, Ohio

[21] Appl. No.: 754,296

[22] Filed: Nov. 20, 1996

[51] Int. Cl.$^{6}$ .................... G09B 25/00

[52] U.S. Cl. .................... 434/72

[58] Field of Search .................... 434/72, 74, 75

[56] References Cited

U.S. PATENT DOCUMENTS

| | | | |
|---|---|---|---|
| 1,032,156 | 7/1912 | Pearson | 434/75 |
| 3,530,593 | 9/1970 | Howard | 434/75 |
| 4,458,435 | 7/1984 | Ackerman | 434/75 X |
| 5,152,689 | 10/1992 | Kurzman | 434/72 X |

FOREIGN PATENT DOCUMENTS

| | | | |
|---|---|---|---|
| 1197193 | 7/1970 | United Kingdom | 434/75 |

*Primary Examiner*—Jeffrey A. Smith
*Attorney, Agent, or Firm*—Mayer, Brown & Platt

[57] ABSTRACT

The present invention is directed to a device and method for selecting surfacing material complementary to a predetermined cabinet finish. The device includes a display having sample display areas. The sample display areas include a resilient member formed with a plurality of recesses for receiving and removably retaining a plurality of surfacing samples selected in a predetermined manner and having characteristics making them complementary to a predetermined cabinet finish.

23 Claims, 2 Drawing Sheets

METHOD AND DEVICE FOR SELECTING COLOR COORDINATED DESIGNS

FIELD OF THE INVENTION

This invention relates in general to a device and method for selecting coordinated surfacing during the design process, for example, the design of a kitchen, and more particularly to a device and method for selecting countertop surfacing that is complementary to a preselected cabinet finish.

BACKGROUND OF THE INVENTION

During the process of designing or remodeling a kitchen, bathroom, wet bar or the like, it has been discovered that consumers initially will focus most of their attention on selecting and purchasing the most expensive items. In the design process of a kitchen, the most expensive item to be purchased and the one that takes up most of the visual area in a kitchen traditionally has been the cabinets. The color scheme and coordination of appliances, countertop surfacing, floor surfacing and other accessories, all flow from the type, color and finish of the cabinets selected.

After selecting a cabinet finish, the task of coordinating the other components that make up the design, such as countertops, flooring and appliances, with the selected cabinet finish remains difficult and often is undertaken by the consumer without assistance. One reason for this difficulty is that there exists an enormous selection of styles, types, colors and textures of the accessories, particularly with respect to countertop surfacing. A consumer, having selected his cabinet design and finish, is generally inundated with literally hundreds of choices with respect to the design, style and color of the countertop surfacing. Moreover, the presentation of the countertop surfacing is generally not arranged in a manner that provides guidance to the consumer in selecting a countertop surfacing complementary to the selected cabinet finish.

Typically, a consumer is confronted with a choice between the various types of countertop surfacing such as laminated surfaces, decorative laminates, solid surfacing, tile and natural stones. Once a consumer gives the sales person a general indication of the type of surfacing he is interested in, the consumer is then shown several countertop surfacing samples, which may exceed one hundred different colors and styles. The consumer is then directed to select a sample from the hundreds of choices. Depending on the type of countertop material preferred, the type of samples used in the design process vary. In the case of laminate, the samples are generally connected by a key ring (see FIG. 1) or hung on a rack outfitted with hooks. The samples generally represent the particular manufacturer's entire selection of styles and colors for countertop surfacing. The samples are generally grouped by color. Solid colors are grouped together generally in succession from lightest to darkest colors. Pattern families are then grouped together with all shades of a particular pattern grouped together also generally from lightest to darkest colors. Solid surfacing materials are also grouped in the same manner either in a box or on a board.

The consumer is generally left alone to select a color and style that coordinates with the preselected cabinet finish. Left to their own devices, many consumers, particularly those with little or no design knowledge may select a color and style of countertop surfacing that appears to be aesthetically pleasing in the abstract, but when combined with their preselected cabinet finish results in an unattractive and uncoordinated appearance. Consumers may also overlook colors and styles that in the abstract do not appear to complement their preselected cabinet finish, but when combined with their preselected cabinet finish would provide an attractive and coordinated appearance. These situations may result in disappointment and may leave the consumer with a bad impression with respect to the countertop surfacing manufacturer. In addition, requiring a consumer to view hundreds of samples, a majority of which are not complementary to a preselected cabinet finish wastes time unnecessarily.

On the other hand, professional service may be provided to the consumer during the selection process. However, providing a trained professional to assist the consumer greatly increases the cost to the retailer and limits the number of consumers that may be assisted at any one time. Moreover, the samples of the countertop surfacing are still not presented in a manner that permits consumers to view several different samples at the same time, all of which are selected for their compatibility, with the preselected cabinet finish.

SUMMARY OF THE INVENTION

It is a general object of the present invention to provide a device that assists in the selection of countertop surfacing or other surfacing material that is intended to complement a preselected cabinet finish.

It is a further object of the present invention to provide a consumer with professional assistance in the selection of countertop surfacing designed to complement a specific cabinet finish without the need for the individual professional to be present during the selection process by the consumer.

Still a further object of the present invention is to provide a display that provides professional assistance to a consumer in the selection of the type, style and color of countertop surfacing that is intended to complement a preselected cabinet finish.

In accordance with a preferred embodiment of this invention, a countertop surfacing display for assisting in the selection of countertop surfacing complementary to a preselected cabinet finish is provided including a display sheet. The display sheet includes a display surface and sample display areas which are defined by folds or hinges located transversely across the display sheet. A plurality of samples of countertop surfacing are provided and are disposed on the sample display areas. The plurality of samples of countertop surfacing are arranged in a predetermined pattern that requires the selection of a predetermined number of solid color samples; a predetermined number of differently colored patterned samples, each of which is similar in color to one each of the predetermined solid color samples; and a predetermined number of differently colored solid surfacing samples, each of which is similar in color to one each of the predetermined solid color samples and the corresponding patterned samples. All of the plurality of samples are aesthetically complementary to the preselected cabinet finish. The display also includes indicia of the specific cabinet finish for which the plurality of samples are complementary.

The present invention may be used in retail environments to provide design assistance to consumers during the selection of countertop surfacing intended to complement a selected cabinet finish. One general method of carrying out the invention is to initially identify the type of cabinet finish to be matched. Next, the type, style and color of a plurality of countertop surfacing that are complementary to the identified cabinet finish are selected from an available universe of countertop surfacing styles, types and colors. The preselected samples are then displayed and identified as being complementary to the identified cabinet finish.

It is to be understood that both the foregoing general description and the following detailed description are exemplary and are intended to provide further explanation of the invention claimed. The accompanying drawings, which are incorporated and constitute part of the this specification are included to illustrate and provide a further understanding of the apparatus and method of the claimed invention.

BRIEF DESCRIPTION OF THE DRAWINGS

The present invention may be better understood with reference to the detailed description in conjunction with the following figures where like numerals denote identical elements, and in which.

DETAILED DESCRIPTION OF THE PREFERRED EMBODIMENT

Figure 1:
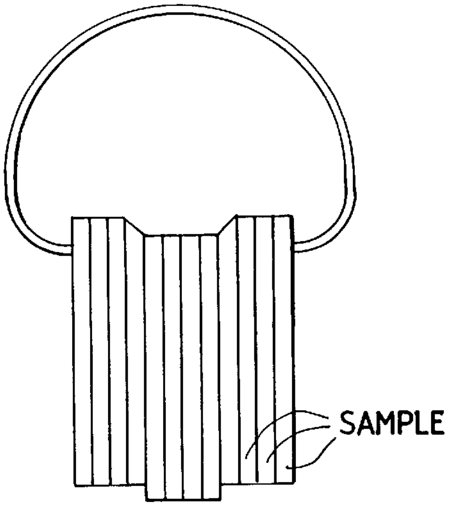
FIG. 1 PRIOR ART
FIG. 1 is a perspective view of the prior art illustrating a series of samples of countertop surfacing connected by a key ring device.
Figure 2:
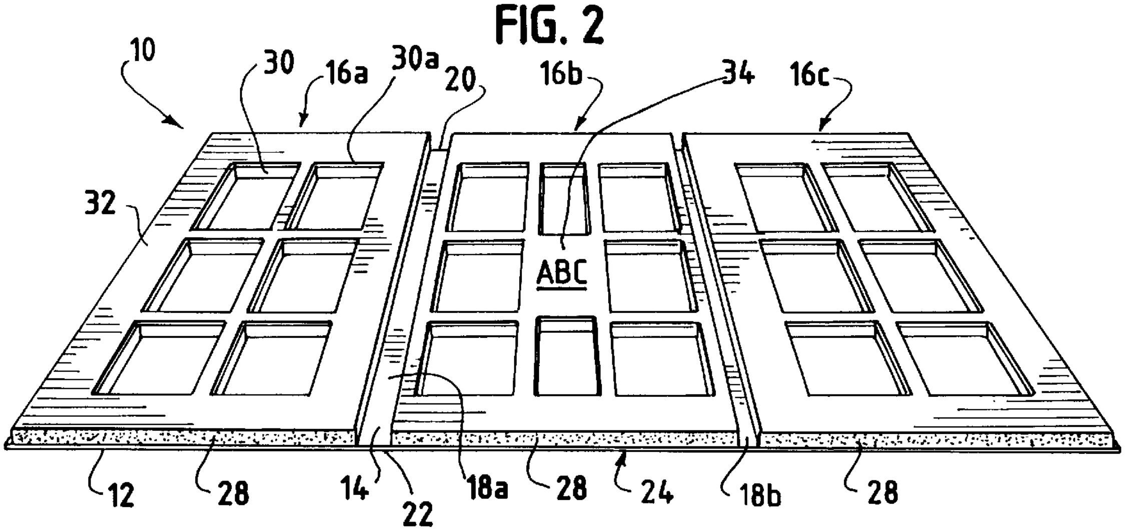
FIG. 2 is a plan view of the display device in an open condition made according to the present invention.
Figure 3:
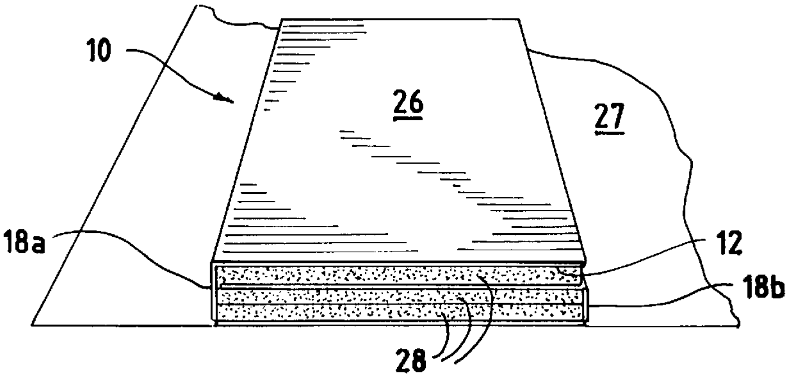
FIG. 3 is an end elevational view of the display device in the closed position made according to the present invention.

A first embodiment of a countertop surfacing selection display 10 constructed in accordance with the principles of the present invention for assisting in the selection of countertop surfacing coordinated with a selected cabinet finish is illustrated in FIG. 2, wherein the display 10 is shown in an open condition. Referring to FIG. 2, the display 10 includes a display panel 12 of a generally elongated rectangular shape having a top surface 14. The top surface 14 is divided into three substantially equal sample display areas 16*a*, 16*b* and 16*c* by hinges or folds 18*a* and 18*b*. The folds 18 extend transversely across the width of the display panel 12 from top edge 20 to bottom edge 22. The width of fold 18*b* is approximately equal to the sum of the thickness of the two sample display areas 16*b* and 16*c* and the samples displayed thereon such that fold 18*b* will not be deformed when the display panel 12 is folded first along fold 18*b* and secondly along fold 18*a* into its closed position as illustrated in FIG. 3. Similarly, fold 18*a* has a width approximately equal to the sum of the thickness of the three sample display areas 16*a*, 16*b* and 16*c*, such that the fold 18*a* will not be deformed when the display panel 12 is folded into its closed position. Display 12 can be folded such that when folded, the bottom surface 24 of sample area 16*b* lays flat on a support surface 27 such as a table and bottom surface 26 of sample area 16*a* is substantially parallel to the support surface. This permits additional displays to be stacked thereupon or the several displays 12 may be arranged upright on their bottom edge 22 in a manner similar to books on a shelf.

Referring to FIGS. 2 and 3, each sample display area 16*a–c* includes a generally rectangular resilient section 28, preferably a plastic foam that is sized to substantially cover each sample display area 16*a–c* and have a thickness of approximately ⅝ inch. The thickness of the foam section 28 are dictated by the thickness of the samples displayed and will have a thickness slightly greater than the samples. The foam sections 28 are mounted on sample display areas 16*a–c*, preferably by adhesive. Each of the foam sections 28 have a series of cut-out sections 30 of various sizes and depths to hold samples of the countertop surfacing. The cut-outs 30 may take the form of any geometric shape including the rectangular and square shapes illustrated in FIG. 2. The depth of each individual cut-out 30 is dependant on the thickness of the sample to be retained therein. For example, with solid surfacing samples, which generally have a width of 7/16 inches, the depth of the cut-out 30 will be slightly deeper, for example ⅝ inches and extend all the way to top surface 14 of display panel 12. For thinner samples, such as laminated countertop surfacing, a portion of the foam section 28 will remain beneath the sample to maintain the top surface of the sample at approximately the same height as the top surface of thicker samples. This insures that the top surface of all of the samples held in the cut-out 30 have a generally uniform height and provide an aesthetically pleasing appearance.

The cut-out sections 30 are slightly smaller in dimension than the samples they are intended to receive and retain so that an interference fit is created between the foam sections 28 and the samples that hold the samples in position and prevent them from dislodging during movement of the display 10. However, the interference fit is not so tight as to permanently affix the samples to the display 10. Alternatively, loop and hook attachment means, such as the type sold under the trade name VELCRO® may be utilized to hold the samples onto the display 10. As patterns are discontinued and styles change, newer designs and colored samples may be provided to replace outdated or undesirable samples. The outdated samples are simply pulled out of the cut-out 30 and a new sample placed in the cut-out 30. As a result, the displays 10 may be routinely updated with new patterns if so desired or the patterns may be maintained in the display permanently.

A protective cover 32 is provided for each of the foam sections 28 to prevent degradation and damage to the foam section 28. The protective cover 32 may be a plastic sheet that is attached to the top surface of the foam sections 28. The protective cover 32 is preferably attached by adhesive. The protective covers include cut-out sections 30*a* that correspond to the cut-out sections 30 in the foam section 28 so that the samples held in the cut-out sections 30 can be viewed without obstruction by a consumer. The protective cover 32 also provides space 34 so that indicia of the type and stock number of the samples may be printed thereon.

Figure 4:
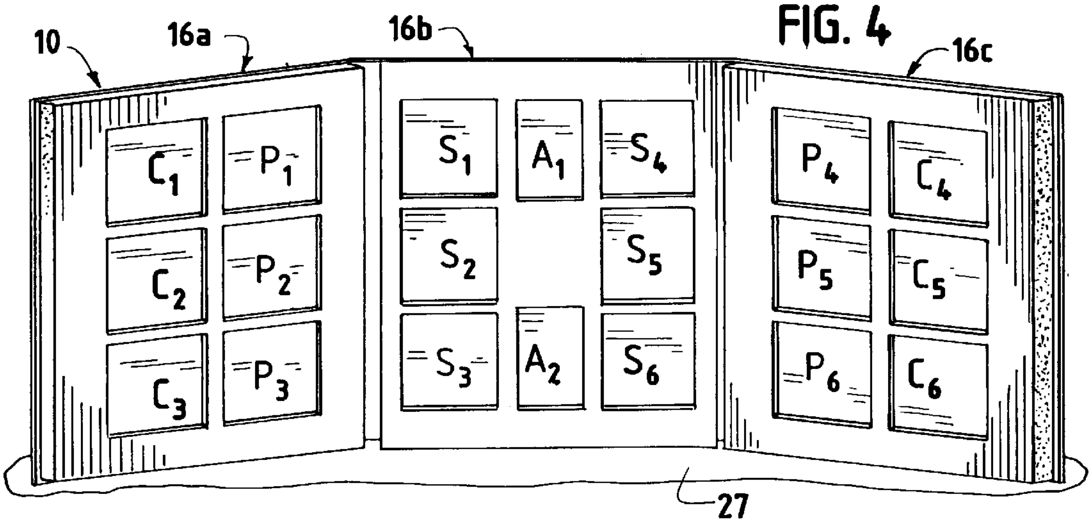
FIG. 4 is a front elevational view of the display device in an upright position made according to the present invention.

Referring now to FIG. 4, the display 10 of the present invention is illustrated in its open position. In the open position, the three distinct display areas 16*a*, 16*b* and 16*c* of the display are visible. The display area include the cut-outs 30 which are arranged in a predetermined pattern. Preferably, in the two outside sample display areas 16*a* and 16*c*, six cut-outs are provided in each to accept six samples of countertop surfacing. The center sample display area 16*b* includes eight cut-outs to accept eight samples of countertop surfacing. Referring to FIG. 4, the preferred embodiment is provided with six solid color countertop surfacing samples compatible with a preselected cabinet finish and designated as $C_1$ through $C_6$. The six solid colors include three neutral colors $C_1$ through $C_3$ arranged from lightest ($C_1$) to darkest ($C_3$) in column 1. Three chromo colors $C_4$ through $C_6$ are arranged in column 7. Six patterned countertop surface samples ($P_1$ through $P_6$) are also provided. Samples $P_1$ through $P_6$ are disposed on display areas 16*a* and 16*c* with samples $P_1$ through $P_3$ disposed in column 2 and samples $P_4$ through $P_6$ disposed in column 6. The color of each of samples $P_1$ through $P_6$ are different. The colors of $P_1$ through $P_6$ are similar to one of each of the colors of samples $C_1$ through $C_6$. Thus, $C_1$ and $P_1$ are of a similar gradation of color. The same is true for each of $C_2$ and $P_2$, $C_3$ and $P_3$, etc. In addition six different solid surfacing samples $S_1$ through $S_6$ are provided. $S_1$ through $S_3$ are disposed in column 3 and $S_4$ through $S_6$ are disposed in column 5. Each of the samples $S_1$ through $S_6$ are different colors which are similar to one each of the samples $C_1$ through $C_6$ and one each of samples $P_1$ through $P_6$. Thus, $C_1$, $P_1$ and $S_1$ are all of a similar gradation of color. The same is true for any combination of $C_n$, $P_n$ and $S_n$ having the same subscript number. All of the samples provided in the display are selected to be complementary to a predetermined cabinet finish. In addition, the display is provided with auxiliary samples $A_1$ and $A_2$ in column 4 of a hybrid solid surfacing type sold under the trade name NUVEL®. These samples $A_1$, $A_2$ are also selected to be complementary to the selected cabinet finish. The display thus provider samples of countertop surfacing of various colors, type and patterns which are selected for their compatibility with a selected cabinet finish. The pattern illustrated in FIG. 4 and described above is just one example of a pattern for displaying countertop surfacing of various style, type and color, all selected for their compatibility with a particular cabinet finish.

It has been found that there are primarily nine cabinet finishes that are used extensively by cabinet manufacturers. These include 1) Natural Cherry, 2) Red Cherry, 3) Dark Hickory, 4) Light Hickory, 5) Natural Maple, 6) Pickled Maple, 7) Natural Oak, 8) Pickled Oak and 9) White. These nine finishes represent substantially the entire universe of available finishes for cabinets sold. As a result, nine separate display devices 10 can be provided, with each individual display 10 dedicated to a particular one of the nine finishes. Consequently, one advantage of display 10 is that consumers who have preselected or have an idea of the cabinet finish they will purchase can go directly to the display 10 identified as corresponding to that particular cabinet finish. The need to review the hundreds of available samples of countertop surfacing is thereby eliminated and the uncertainty as to the compatibility of a countertop surfacing with a selected cabinet finish is also eliminated. In addition, another significant advantage is that professional design or decorating personnel need not be consulted to find countertop surfacing that coordinates with the selected cabinet finish at the time the consumer makes the purchase. Moreover, because the displays are limited to samples compatible with a specific cabinet finish, a potential purchaser may take the display 10 home to review it in private or compare the samples to the preselected cabinet finish in their home without the necessity to remove from the retail outlet the entire set of countertop surfacing samples. Potential customers may also be provided with individual product samples that correspond to the samples selected from the display 10.

In preparing the display 10, the initial selection of the colors in the display 10 may be selected by a designer or professional decorator familiar with the various cabinet finishes and the generally hundreds of available surfacing selections. It should be understood that despite the slight variances in different manufacturers' cabinet finishes of the same type (i.e. all light hickory finishes of all manufacturers are not identical) the countertop surfacing samples provided are selected for their compatibility with substantially all manufacturers' designated finishes. Thus a sample selected as complementary to light hickory cabinet finishes will generally be complementary to all manufacturers' light hickory cabinet finishes.

The various samples may be selected by a designer or professional decorator familiar with the various popular cabinet finishes. In particular, the designer in selecting the samples provided in the display of the present invention will identify the type of cabinet finish for which samples are desired. Review will then be made of the universe of available countertop surfacing. Those surfacing designs and colors that are aesthetically compatible with the identified cabinet finish may be selected. It is preferred that the samples selected include six solid colors, six patterned samples of different colors which are similar to one of each of the colors of the solid color samples and six solid surfacing selections of different colors which are similar to one of each of the colors of the solid color surfaces selected. In addition, at least two auxiliary samples, should be selected preferably a hybrid solid surfacing material, for example, solid surfacing material sold under the trade name NUVEL® all of which are compatible with the selected cabinet finish. Alternatively, the selections may be any number of various styles and type of countertop surfacing samples that are aesthetically compatible with the identified cabinet finish.

Figure 7:
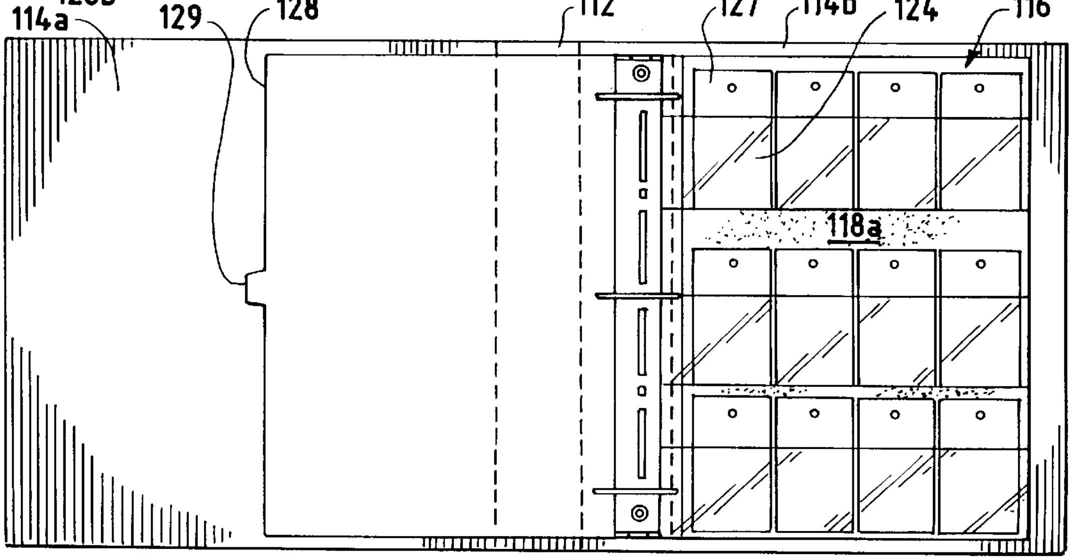
FIG. 7 is a plan view of a alternative embodiment of the display device in an open condition made according to the present invention.

Once selected, the samples, which are compatible with the identified cabinet finish, are placed in a viewable medium, for example, the display 10. In addition, the display medium may be a video terminal that display videographic representation of the preselected samples. Finally, the preselected samples are identified as being compatible with the identified cabinet finish.

Where a retail outlet is not very large or where space is a concern or where a portable display tool for use by the dealers salespeople is desired, an alternative embodiment of the display 10 made according to the present invention is illustrated in FIG. 7. The display 110 is illustrated in an open position. The display 110 is in the general form of a binder with a single hinge 112 and two cover sections 114*a* and 114*b*. The display includes a plurality of display sheets 116.

Figure 5:
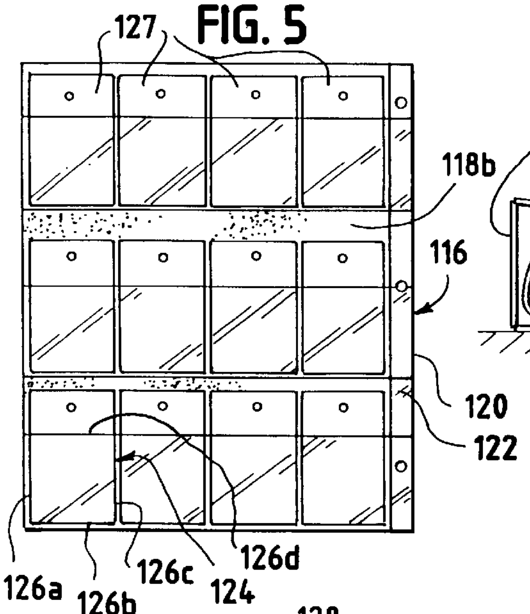
FIG. 5 is a plan view of a display sheet of the alternative embodiment of FIG. 7.
Figure 6:
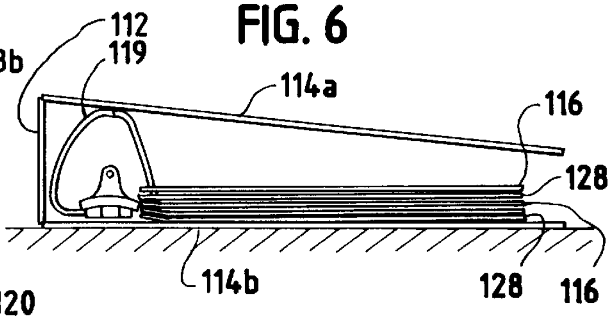
FIG. 6 is a end view of the alternative embodiment of the display device in the closed position.

Referring now to FIGS. 5–7 each individual display sheet 116 is reserved for countertop surfacing samples selected for their compatibility with a specific cabinet finish. Thus, one display sheet 116 contains countertop surfacing samples selected for their color compatibility with, for example, a light hickory cabinet finish. Another display sheet 116 contains countertop surfacing samples selected for their compatibility with, for example, dark hickory cabinet finishes. Display 110 includes nine individual display sheets 116 each adapted to hold countertop surfacing samples directed to one of the nine various cabinet finishes identified above. Each individual display sheet 116 is connected to the display 110 via rings 119 extending from hinge 112 through the display sheets 116 adjacent an edge 120 of the display sheets in manner well known in the art.

Each display sheet 116 is preferably made from a relatively rigid base sheet 122 such as cardboard or heavy paper. The base sheet 122 may be covered with a plastic protective coating to prevent moisture and contact from use from effecting the rigidity of the base sheet 122. Alternatively, the display sheet 116 may be made from a sheet of relatively rigid plastic which would not require a plastic coating.

The display sheets 116 include two display surfaces 118*a* and 118*b*. Each display surface 118 of each individual display sheet 116 includes three rows of four pockets 124 disposed on the surface. The pockets 124 are formed by clear plastic rectangular sections secured to the surface along three edges 126*a, b*, and *c* with a top edge 126*d* open forming the pocket 124. The three edges of the pocket 124 may be attached using adhesive or bonded to the plastic surface in a manner well known in the art such as ultrasonic welding.

The pockets 124 are sized to accept rectangularly shaped countertop surfacing samples 127 sized slightly longer than the pockets 124. The pockets may be shaped to receive other shapes of surfacing samples as well. The smaller size of the pockets 124 permits the samples to extend above the open end of the pockets 124 and therefore to be grasped and removed from the pocket 124. The samples adapted to be inserted in the pockets 124 are selected for their compatibility with a specific cabinet finish. Each individual display sheet 116 holds twenty-four samples. In addition, a divider sheet 128 maybe placed between each individual display sheet 116 when the display sheets are arranged in the display 110. The divider sheet 128 preferably includes a tab 129 that extends laterally beyond the adjacent corresponding display sheet 110. The divider sheets 128 and the tab 129 may include indicia identifying the following display sheet 116 as having surfacing samples compatible with one of the nine available cabinet finishes. Alternatively, the display sheet 116 itself may include indicia indicating that the samples carried on the display sheet 116 are compatible with a specific cabinet finish.

The display 110 thus provides consumers with countertop surfacing samples that are segregated by compatibility with a specific cabinet finish. The selection of the samples for each display sheet 116 is performed to provide samples of various colors and styles that are complementary to a specific cabinet finish. In addition, the open ended pockets 124 also provide easy removability of the samples so that they may be held in close proximity to the desired cabinet finish enabling the consumer to better evaluate their choice of surfacing. Moreover, the open ended pockets in the display permit the surfacing samples to be replaced or changed with ease.

While two embodiments of the display for use in selecting countertop surfacing of this invention has been shown in accordance with the invention, as well as methods of operation, it should be apparent to those skilled in the art that what has been described is considered at the present to be a preferred embodiment of the countertop surfacing display and the methods of operation in accordance with this invention. In accordance with the patent statutes, changes may be made in the display and its operation in accordance with this invention without actually departing from the true spirit and scope of this invention, for example, flooring surfacing samples, selected for their compatibility with a predetermined cabinet finish may be substituted for the countertop surfacing. The following claims are intended to cover all such changes and modifications which fall in the true spirit and scope of this invention.

What is claimed is:

1. A device for assisting in the selection of countertop surfacing complementary to a predetermined cabinet finish, said device comprising:

a display sheet including a display surface, said display sheet having at least one hinge disposed transversely thereacross for defining discreet display areas;

a resilient body disposed on each of said display areas, said resilient body having a predetermined thickness and a series of recesses formed in said resilient body;

a plurality of countertop surfacing samples retained separately in said series of recesses formed in said resilient body, said plurality of samples selected from an available universe of surfacing samples and having characteristics making them aesthetically complementary to said predetermined cabinet finish; and indicia of said predetermined cabinet finish disposed on said device.

2. The device of claim 1 wherein said predetermined cabinet finish includes at least one of the following: natural cherry, red cherry, dark hickory, light hickory, natural maple, pickled maple, natural oak, pickled oak, and white.

3. The device of claim 1 wherein said plurality of countertop surfacing samples are sized and shaped to form a releasable interference fit with said recesses when placed therein.

4. The device of claim 1 wherein said resilient body includes foam.

5. The device of claims 1 wherein said plurality of countertop surfacing samples includes a predetermined number of solid color samples, a predetermined number of patterned samples and a predetermined number of solid surfacing samples arranged in a predetermined pattern on said display sheet.

6. The device of claim 5 wherein said predetermined number of solid color samples includes 3 neutral colors and three chromo colors.

7. The device of claim 5 wherein said predetermined number of patterned samples includes patterned samples each of which has a color similar to one of said predetermined number of solid color samples.

8. The device of claim 5 wherein the color of each of said predetermined number of solid surfacing samples is different and corresponds to the color of one of said predetermined number of solid color samples.

9. The device of claim 1 wherein said plurality of countertop surfacing samples includes six differently colored solid color samples including three neutral colors and three chromo colors, designated as $C_1$ through $C_6$, six patterned samples designated $P_1$ through $P_6$ of is different colors similar in color to one of each of the solid color samples $C_1$ through $C_6$, six solid surfacing samples designated as $S_1$ through $S_6$ of different colors similar in color to one of each of the solid color samples $C_1$ through $C_6$, and two auxiliary surfacing samples $A_1$ and $A_2$ all of which are arranged in a predetermined pattern on said display sheet, wherein solid color samples $C_1$ through $C_3$ are disposed in a vertical column on one of said display areas and patterned samples $P_1$ through $P_2$ are arranged adjacent said samples $C_1$ through $C_3$ in a vertical column one said one of said display areas, said solid surfacing samples $S_1$ through $S_3$ and $S_4$ through $S_6$ and $A_1$ through $A_2$ are each arranged in vertical columns on a second one of said display areas, and solid color samples $C_4$ through $C_6$ and patterned samples $P_4$ through $P_6$ are each arranged in vertical columns on a third of said display areas.

10. The device of claim 1 wherein said at least one hinge includes two hinges defining three discreet display areas such that a first one of said display areas is adapted to fold onto a second one of said display areas and a third one of said display areas is adapted to fold onto said first one of said display areas.

11. A method for assisting in the selection of surfacing by consumers which surfacing is intended to be complementary to predetermined cabinet finishes, said method comprising:

identifying the cabinet finish to be matched;

preselecting from a universe of surfacing samples a set of surfacing samples having characteristics that are aesthetically complementary to the identified cabinet finish;

displaying said set of surfacing samples in a self contained viewable medium separate from the remainder of the universe of surfacing samples and accessible to consumers; and identifying said set of surfacing samples as being complementary to said identified cabinet finish.

12. The method of claim 11 wherein the step of identifying the cabinet finish includes identifying the cabinet finish as one of the following: natural cherry, red cherry, dark hickory, light hickory, natural maple pickled maple, natural oak, pickled oak and white.

13. The method of claim 11 wherein the step of preselecting includes selecting a predetermined number of solid color samples, selecting a predetermined number of patterned samples and selecting a predetermined number of solid surfacing samples.

14. The method of claim 11 wherein the step of preselecting includes selecting six differently colored solid color samples, selecting six differently colored patterned samples each of which is similar in color to one of each of the colors of said six solid color samples, and selecting six differently colored solid surfacing samples each of which is similar in color to one of each of the colors of said six solid color samples.

15. The method of claim 11 wherein the step of displaying includes arranging in a predetermined pattern said set of samples in a device for assisting in the selection of countertop surfacing complimentary to a predetermined cabinet finish, said device comprising:

a display sheet including a display surface, said display sheet having at least one hinge disposed transversely thereacross for defining discreet display areas;

a resilient body disposed on each of said display areas; said resilient body having a predetermined thickness and a series of recesses formed in said resilient body, said recesses sized and shaped to form releasable interference fits with individual samples of said set of surfacing samples.

16. The method of claim 11 wherein said step of identifying includes providing indicia of said identified cabinet finish on said display medium.

17. A device for assisting in the selection of surfacing that is complementary to a predetermined cabinet finish, said device comprising:

at least one display sheet having a front surface and a back surface, indicia on said display sheet designating said display sheet as corresponding to one of a series of predetermined cabinet finishes;

a series of display pockets formed from relatively flexible sheet material connected along a portion of its periphery to either of the front surface and/or back surface of said display sheet, said pockets receiving and removably retaining plurality of countertop surfacing samples preselected to be complementary to said one of a series of predetermined cabinet finishes; and means for displaying a plurality of said display sheets.

18. The device of claim 17 including means for maintaining a plurality of said display sheets together.

19. The device of claim 17 wherein said pockets include clear plastic rectangular sections connected about two side edges and a bottom edge to said surface leaving an open top edge.

20. The device of claim 17 wherein said series of predetermined cabinet finishes includes the following finishes: natural cherry, red cherry, dark hickory, light hickory, natural maple, pickled maple, natural oak, pickled oak, and white.

21. The device of claim 17 further including a display sheet reserved for the display of solid surfacing material.

22. The device of claim 17 wherein said plurality of surfacing samples are preselected from available universe of surfacing samples and having characteristics making them aesthetically complementary to said predetermined cabinet finish.

23. The device of claim 17 wherein said surfacing includes countertop surfacing.

* * * * *